Mar. 6, 1923. Re. 15,554

J. SCHNEIBLE

CONDENSER

Original Filed Aug. 2, 1919 3 sheets-sheet 1

Inventor:
Joseph Schneible,
By Dyrenforth, Lee, Christy and Niles,
Attys.

Mar. 6, 1923. Re. 15,554

J. SCHNEIBLE

CONDENSER

Original Filed Aug. 2, 1919 3 sheets-sheet 2

Inventor:
Joseph Schneible,
By Dyrenforth, Lee, Christopher & Wilks,
Attys.

Mar. 6, 1923. Re. 15,554

J. SCHNEIBLE

CONDENSER

Original Filed Aug. 2, 1919 3 sheets-sheet 3

Inventor:
Joseph Schneible,
By Dyrenforth, Lee, Christon and Wills,
Attys.

Reissued Mar. 6, 1923. Re. 15,554

UNITED STATES PATENT OFFICE.

JOSEPH SCHNEIBLE, OF CHICAGO, ILLINOIS.

CONDENSER.

Original No. 1,366,957, dated February 1, 1921, Serial No. 314,818, filed August 2, 1919. Application for reissue filed April 26, 1922. Serial No. 556,772.

*To all whom it may concern:*

Be it known that I, JOSEPH SCHNEIBLE, a citizen of the United States, residing at 130 North Wells Street, Chicago, in the county of Cook and State of Illinois, have invented a new and useful Improvement in Condensers, of which the following is a specification.

My invention relates to an improvement in the class of condensers such are are employed in the art of distillation.

The primary object of my invention is to provide a construction of condenser whereby the vapors to be condensed shall be caused, in their course through the device, to have thorough and prolonged intimate contact with the cooling medium.

Figure 1:
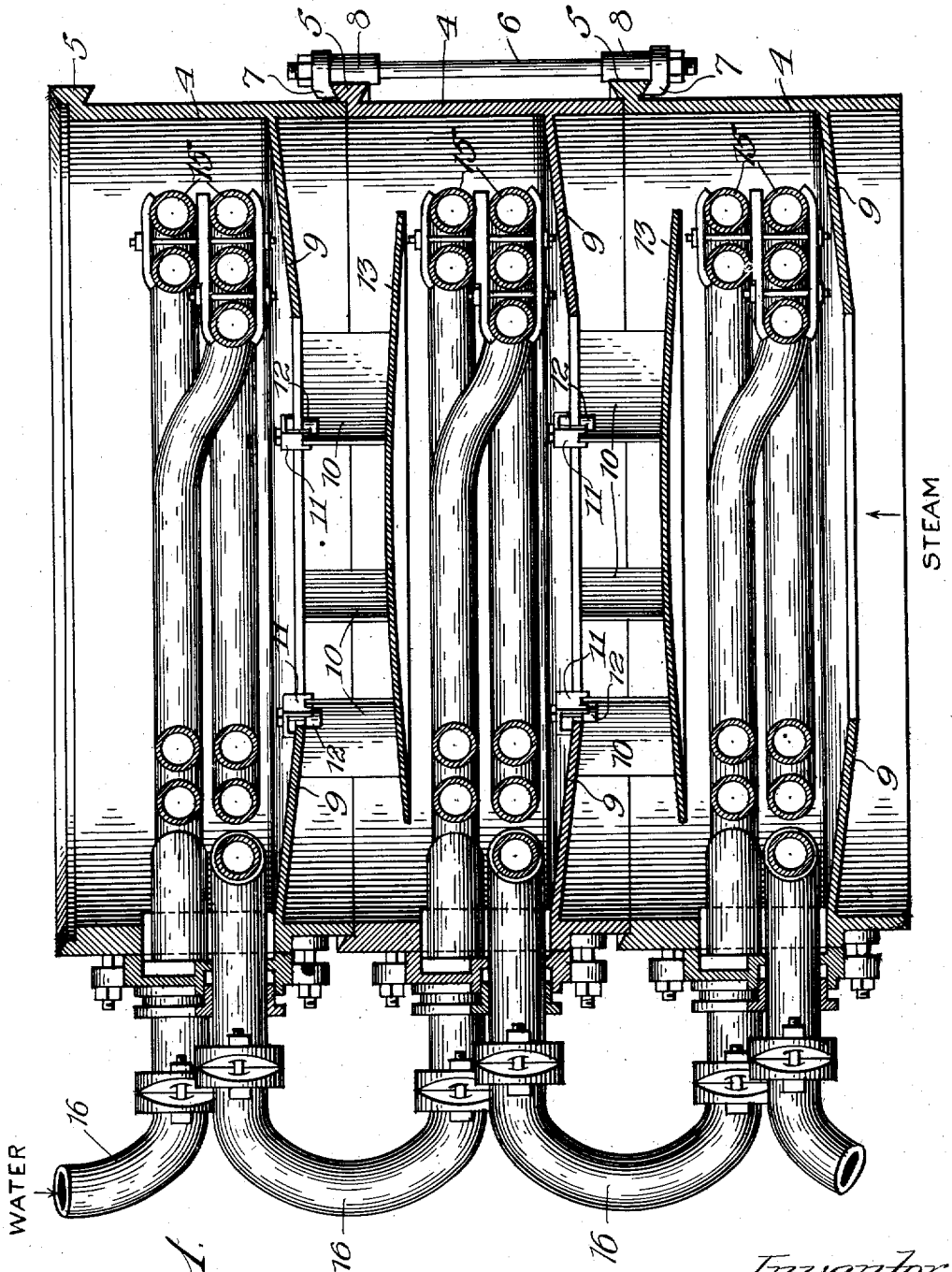
Figure 2:
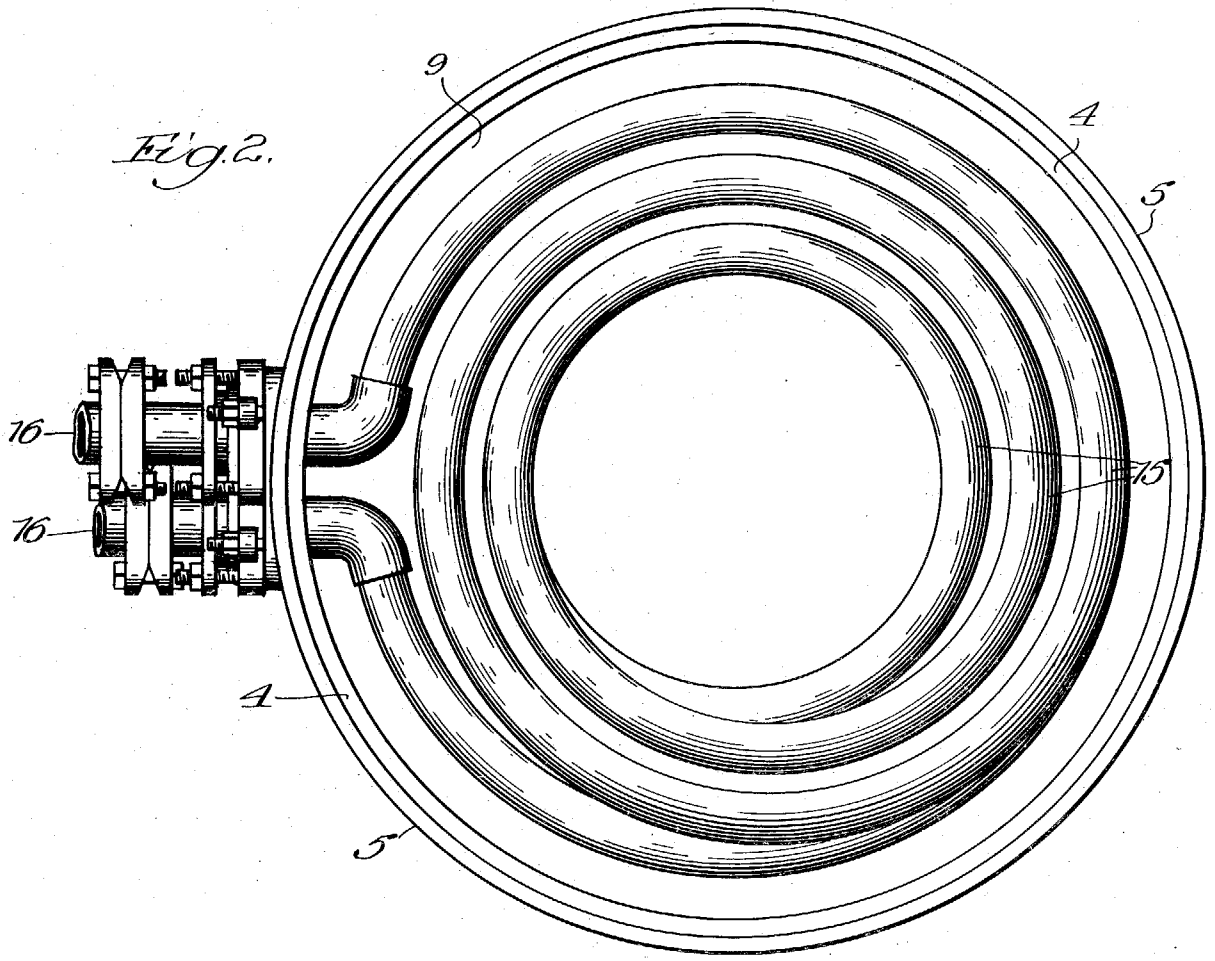
Figure 3:
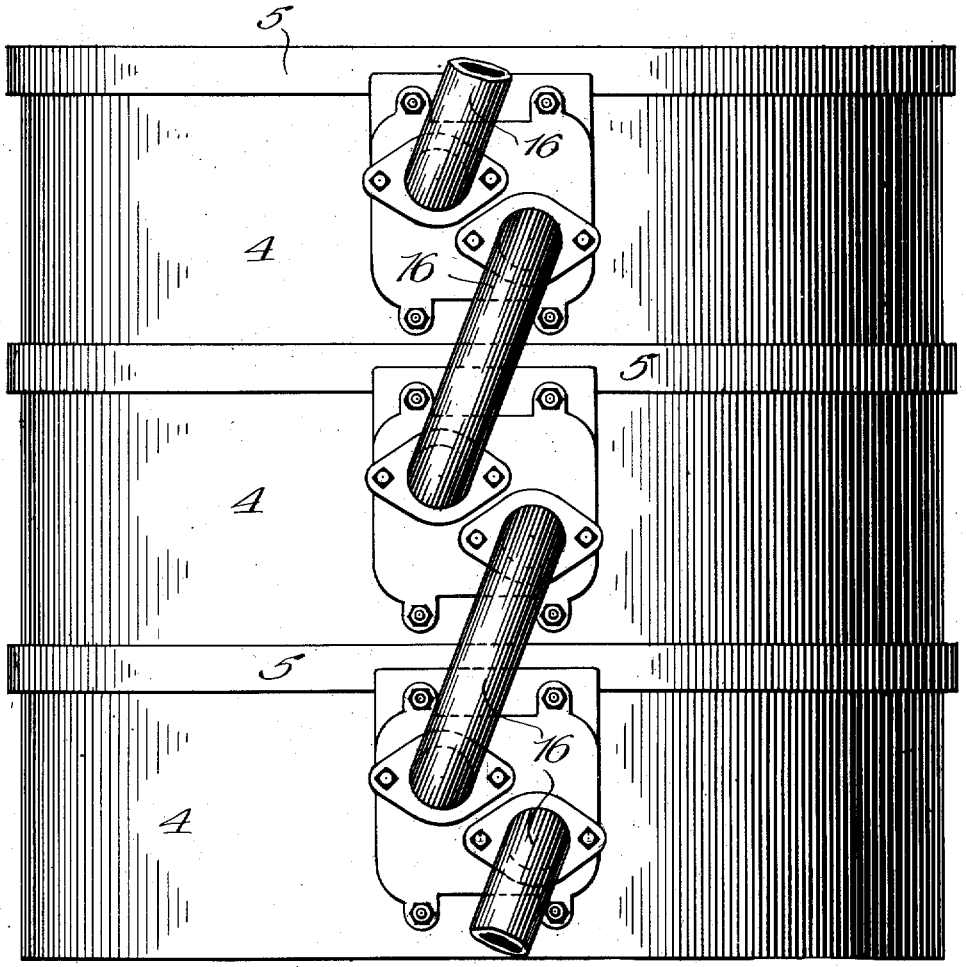

In the accompanying drawings, Figure 1 is a broken view in vertical sectional elevation of a condenser embodying my invention; Fig. 2 is a plan view and Fig. 3 is a view in elevation of the same.

The body or casing of the condenser is preferably but not necessarily built of a desired number of annular sections 4, shown of preferred cylindrical form and each being provided about its upper end with a flange 5. The flange is of general V-shape in cross-section and projects beyond the upper end of the section to adapt the sections to lap or interfit one against the other within the confines of the flange, as shown; and the sections are shown to be held together by a coupling-medium, of which only one is represented in Fig. 1, though a plurality thereof are used about the structure in practice. This coupling medium is a bolt-rod 6 carrying nuts on its opposite ends, against which abut hooks 7 on sleeves 8 slidably surrounding the rod. One hook engages the flange about one section 4 in the assembly of sections, and the other hook engages the flange on another section; and after being thus engaged, by tightening either or both of the nuts the coupled sections are tightly drawn together.

An annular baffle-plate or baffle-ring 9 extends from the inner wall of each section in downwardly-inclined direction toward the center. Below each baffle 9, except the lowermost, are rigid guide-vanes 10 rising in circular series from a concavo-convex deflector-plate, with which they are integral; and alternate vanes are rigidly fastened at their inner upper corner-portions to the baffle by clips 11 bolted through bosses 12 on the vanes to suspend the vane-and-deflector plate structure on the baffle-ring. A condenser-coil 15 is supported to extend in the interior of each section 4 about the annular space in the baffle-ring 9 below it. The terminals of the coils lead through stuffing-box and gland devices of ordinary construction shown to be provided at corresponding points on the successive casing-sections 4, and the outlet-end of the uppermost coil is connected with the inlet-end of the next lower coil by an elbow or return-bend 16; and so on throughout the series of coils, to render them intercommunicating.

The cooling medium employed, which may be cold water, brine or other medium, flows downwardly through the series of coils and is thus circulated through the interior of the condenser-casing, and the vapors to be condensed rise therein. In rising, the vapors first encounter the lowermost baffle-ring and passing through the latter they circulate about the adjacent coil 15 and are spread by the adjacent deflector plate 13, whence they pass through the vanes 10 immediately above it, which tend to spread them in their course and enhance the cooling influence thereon of the next coil; and from these vanes the vapors seek their outlet through the next higher annular baffle and proceed to contact with the next cooling-coil, whence they are deflected to enter the uppermost series of vanes to be again brought into contact with the final coil before discharging from the condenser to a suitable receptacle (not shown).

I realize that considerable variation is possible in the details of construction thus specifically shown and described and I do not intend by illustrating a single specific or preferred embodiment of my invention to be limited thereto, my intention being in the following claims to claim protection for all the novelty there may be in my invention as broadly as the state of the art will permit.

I claim:

1. A condenser comprising a casing provided internally with a baffle-ring, a deflector-plate above said ring and positioned above the opening therein, and cooling coils supported above the ring and surrounding the openings therein.

2. A condenser comprising a casing provided internally with a baffle-ring, a cooling-coil supported above said ring, and a deflector-plate above said coil of greater diameter than the diameter of the baffle-ring opening and overlapping said opening.

3. A condenser comprising a casing provided internally with a baffle-ring, a cooling-coil supported above said ring, a deflector-plate above said coil and a series of guide-vanes between the deflector-plate and baffle-ring.

4. A condenser comprising a casing provided internally with a series of spaced baffle-rings, a cooling-coil above each baffle-ring and extending about the opening therein, a deflector-plate above each coil and guide-vanes between each deflector-plate and baffle-ring.

5. A condenser comprising a casing formed of a series of annular sections, baffle-rings at intervals in the casing-section, deflector-plates above the baffle-rings, guide-vanes extending between said plates and rings, and cooling-coils supported in the casing-sections between said rings and plates.

6. A condenser comprising a casing formed of a series of annular sections, baffle-rings at intervals in the casing-sections and inclining downwardly toward the centers thereof, deflector-plates above the baffle-rings, guide-vanes extending between said plates and rings, and intercommunicating cooling-coils supported in the casing-sections between said rings and plates.

7. A condenser comprising a casing formed of a series of annular-sections, baffle-rings at intervals in the casing-sections, deflector-plates above the baffle-rings, guide-vanes extending between said plates and rings, cooling-coils supported in the casing-sections between said rings and plates, and return-bends connecting the coils in succession exteriorly of the casing.

JOSEPH SCHNEIBLE.